(12) United States Patent
VanBlon et al.

(10) Patent No.: US 9,463,808 B2
(45) Date of Patent: Oct. 11, 2016

(54) DETERMINING AVAILABLE CAPACITY IN A TRANSPORTATION MECHANISM

(71) Applicant: LENOVO (Singapore) PTE, LTD., New Tech Park (SG)

(72) Inventors: Russell Speight VanBlon, Raleigh, NC (US); John Carl Mese, Cary, NC (US); Nathan J. Peterson, Durham, NC (US); Rod D. Waltermann, Rougemont, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/643,686

(22) Filed: Mar. 10, 2015

(65) Prior Publication Data
US 2016/0264149 A1    Sep. 15, 2016

(51) Int. Cl.
*B66B 1/34*    (2006.01)
*B60W 50/00*    (2006.01)
*B66B 1/28*    (2006.01)

(52) U.S. Cl.
CPC ........... *B60W 50/0098* (2013.01); *B66B 1/28* (2013.01); *B66B 1/3476* (2013.01)

(58) Field of Classification Search
None
See application file for complete search history.

(56) References Cited

U.S. PATENT DOCUMENTS

| 5,490,580 | A | * | 2/1996 | Powell | ................ | B66B 1/2408 |
| | | | | | | 187/281 |
| 5,703,367 | A | * | 12/1997 | Hashimoto | ........ | G06K 9/00369 |
| | | | | | | 250/342 |
| 7,093,693 | B1 | * | 8/2006 | Gazdzinski | ............. | B66B 1/468 |
| | | | | | | 187/384 |

* cited by examiner

*Primary Examiner* — Thomas Tarcza
*Assistant Examiner* — Garrett Evans
(74) *Attorney, Agent, or Firm* — Kunzler Law Group

(57) ABSTRACT

Methods, apparatuses, systems, and program products are described for determining available capacity in a transportation mechanism. An object module identifies one or more objects within a transportation mechanism based on input received from a sensor. A capacity module determines an available capacity of the transportation mechanism as a function of the one or more identified objects. A service module services a call request in response to the available capacity satisfying a predetermined threshold.

20 Claims, 6 Drawing Sheets

DETERMINING AVAILABLE CAPACITY IN A TRANSPORTATION MECHANISM

BACKGROUND

1. Field

The subject matter disclosed herein relates to transportation mechanisms and more particularly relates to determining the available capacity in a transportation mechanism.

2. Description of the Related Art

Transportation mechanisms, such as elevators, subways, trains, etc., may have certain periods of time where they are at or near capacity. During these periods of time, the transportation mechanism may service call requests to pick up persons waiting to ride the transportation mechanism, even if there is no room in the transportation mechanism for the persons. Thus, the transportation mechanism may unnecessarily stop to service the call request, which is inefficient, a waste of time, and frustrating to persons waiting to ride the transportation mechanism and persons already riding the transportation mechanism. Moreover, persons waiting to ride the transportation mechanism may be required to call the transportation mechanism again.

BRIEF SUMMARY

An apparatus for determining available capacity in a transportation mechanism is disclosed. A method and computer program product also perform the functions of the apparatus. In one embodiment, an apparatus includes a sensor, a processor communicatively coupled to the sensor, and a memory that stores code executable by the processor. In some embodiments, the code includes code that identifies one or more objects within a transportation mechanism based on input received from the sensor.

In a further embodiment, the code includes code that determines an available capacity of the transportation mechanism as a function of the one or more identified objects. The code may also include code that services a call request in response to the available capacity satisfying a predetermined threshold. In various embodiments, the code includes code that ignores a call request in response to the available capacity not satisfying the predetermined threshold.

In one embodiment, the code includes code that determines an amount of capacity that each object of the one or more identified objects utilizes. The amount of utilized capacity may comprise an amount of utilized floor space. In certain embodiments, determining the available capacity of the transportation mechanism comprises determining an available amount of floor space in the transportation mechanism as a function of the determined amount of floor space utilized by the one or more objects within the transportation mechanism.

In some embodiments, the code includes code that determines a buffer area for each of the one or more identified objects. The buffer area may comprise an additional amount of utilized floor space for each identified object. In some embodiments, the buffer area for an identified object is determined as a function of a weather condition. In a further embodiment, the buffer area for an identified object is determined as a function of one or more of a type and a size of the identified object. In certain embodiments, the identified object comprises a person, and the buffer area for the person is determined as a function of an identity of the person. In one embodiment, the buffer area for an identified object is determined as a function of a position of the identified object within the transportation mechanism.

In one embodiment, the code includes code that determines one or more predefined characteristics for an identified object. The one or more characteristics may be selected from the group consisting of a location of the object and a predetermined capacity utilization of the object. In one embodiment, the code includes code that tracks usage patterns associated with an identified object. The available capacity may be determined as a function of the usage patterns. The sensor, in some embodiments, is selected from the group consisting of a camera, a proximity sensor, a motion sensor, an infrared sensor, a laser sensor, an occupancy sensor, a pressure sensor, and an acoustic sensor.

A method, in one embodiment, includes identifying, by use of a processor, one or more objects within a transportation mechanism based on input received from a sensor. The method may further include determining an available capacity of the transportation mechanism as a function of the one or more identified objects. In certain embodiments, the method includes servicing a call request in response to the available capacity satisfying a predetermined threshold.

In a further embodiment, the method includes ignoring a call request in response to the available capacity not satisfying the predetermined threshold. In some embodiments, the method includes determining an amount of capacity that each object of the one or more identified objects utilizes. The amount of utilized capacity may comprise an amount of utilized floor space.

In one embodiment, determining the available capacity of the transportation mechanism comprises determining an available amount of floor space in the transportation mechanism as a function of the determined amount of floor space utilized by the one or more objects within the transportation mechanism. In a further embodiment, the method includes determining a buffer area for each of the one or more identified objects. The buffer area may comprise an additional amount of utilized floor space for each identified object.

In some embodiments, the buffer area for an identified object is determined as a function of one or more of a weather condition, a type of the identified object, a size of the identified object, a position of the identified object within the transportation mechanism, and an identity of a person, in response to the identified object comprising a person. The method may also include tracking usage patterns associated with an identified object. The available capacity may be determined as a function of the usage patterns.

A program product may include a computer readable storage medium that stores code executable by a processor. The executable code may comprise code to perform identifying one or more objects within a transportation mechanism based on input received from a sensor. In some embodiments, the executable code includes code to perform determining an available capacity of the transportation mechanism as a function of the one or more identified objects. The executable code, in one embodiment, includes code to perform servicing a call request in response to the available capacity satisfying a predetermined threshold.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
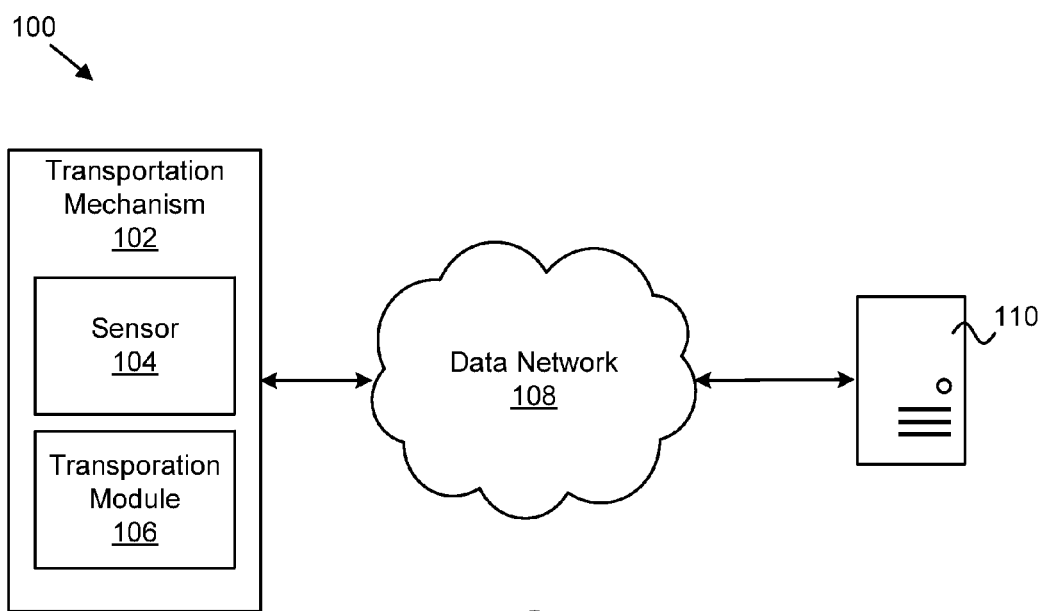
FIG. 1 is a schematic block diagram illustrating one embodiment of a system for determining available capacity in a transportation mechanism.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a system 100 for determining available capacity in a transportation mechanism 102. In one embodiment, the system 100 includes a transportation mechanism 102, which includes a sensor 104 and a transportation module 106, a data network 108, and a server 110. In some embodiments, the system 100 may include a plurality of transportation mechanisms 102, sensors 104, transportation modules 106, data networks 108, and servers 110.

As used herein, a transportation mechanism 102 may comprise an apparatus, device, structure, or the like that is configured to transport, carry, or otherwise move people and goods from one location to another location. Examples may include elevators, trains, subway systems, metro systems, light rail systems, automated taxis, and/or the like. As will be clear to one of skill in the art, even though the examples below focus on an elevator system, the subject matter disclosed herein may be applicable to various types of transportation mechanisms 102.

In one embodiment, for example, an elevator may comprise a type of vertical transport equipment that moves people and/or goods between floors/levels/decks of a building, vessel, or other structure. Elevators can be powered by electric motors that either drive traction cables or counterweight systems like a hoist, or pump hydraulic fluid to raise a cylindrical piston like a jack. In certain embodiments, an elevator is automatically controlled from within the elevator using a control panel with various buttons, such as buttons to choose a floor/level/deck, door open/close buttons, or the like. An elevator, in a further embodiment, is automatically controlled from outside the elevator using an external call box that includes call buttons (e.g., up/down buttons) located on each floor/level/deck to call the elevator to pick up passengers at a particular floor/level/deck.

The transportation mechanism 102, in some embodiments, includes one or more sensors 104 configured to determine the presence of an object within the transportation mechanism 102. For example, the sensors 104 may be configured to detect the presence of a person, a cart, an animal, luggage, or the like. In some embodiments, the sensors 104 may be configured to determine distances between objects and/or the walls/floor/ceiling of the transportation mechanism 102, locations/positions of objects within the transportation mechanism 102, weather conditions where the transportation mechanism 102 is located, and/or the like. The sensors 104 may include cameras, proximity sensors, motion sensors, infrared sensors, laser sensors, occupancy sensors, pressure sensors, acoustic sensors, and/or the like.

The transportation module 106, in one embodiment, is configured to identify one or more objects within the transportation mechanism 102 based on input received from one or more sensors 104. The transportation module 106, in a further embodiment, is configured to determine an available capacity within the transportation mechanism 102 as a function of the one or more identified objects. The transportation module 106, in some embodiments, services a call request in response to the available capacity satisfying a predetermined threshold. Otherwise, the transportation module 106, in response to the available capacity not satisfying a predetermined threshold, ignores a call request until there is available capacity within the transportation mechanism 102. In this manner, the transportation module 106 prevents the transportation mechanism 102 from unnecessarily servicing call requests when the transportation mechanism 102 is at capacity, which may increase the efficiency of the transportation mechanism 102 and decrease the wait times for users both within and outside the transportation mechanism 102.

The data network 108, in one embodiment, comprises a digital communication network that transmits digital communications associated with the transportation module 106. The data network 108 may include a wireless network, such as a wireless cellular network, a local wireless network, such as a Wi-Fi network, a Bluetooth® network, a near-field communication (NFC) network, an ad hoc network, and/or the like. The data network 108 may include a wide area network (WAN), a storage area network (SAN), a local area network (LAN), an optical fiber network, the internet, or other digital communication network. The data network 108 may include two or more networks. The data network 108 may include one or more servers, routers, switches, and/or other networking equipment. The data network 108 may also include computer readable storage media, such as a hard disk drive, an optical drive, non-volatile memory, random access memory (RAM), or the like.

The server 110, in one embodiment, is configured to store and/or make accessible data associated with the transportation mechanism 102, sensors 104, and/or the transportation module 106 using the data network 108. In certain embodiments, the transportation mechanism 102, sensors 104, and/or the transportation module 106 is in communication with the server 110 via the data network 106. The server 110 may comprise a file server, a media server, a web server, an email server, a cloud server, a virtual server, and/or the like.

Figure 2:
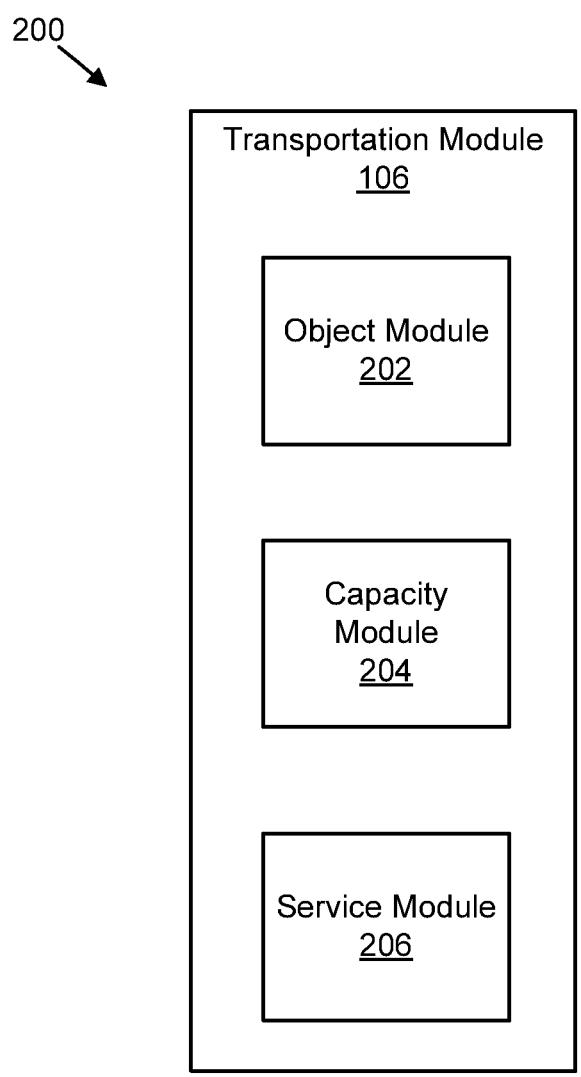
FIG. 2 is a schematic block diagram illustrating one embodiment of a module for determining available capacity in a transportation mechanism.

FIG. 2 is a schematic block diagram illustrating one embodiment of a module 200 for determining available capacity in a transportation mechanism 102. In one embodiment, the module 200 includes an embodiment of a transportation module 106. The transportation module 106, in certain embodiments, includes one or more of an object module 202, a capacity module 204, and a service module 206, which are described in more detail below.

In one embodiment, the object module 202 is configured to identify one or more objects within a transportation mechanism 102 based on input received from a sensor 104. In some embodiments, the object module 202 identifies an object by determining an object's presence, size, location, or the like based on the received sensor 104 input. For example, the object module 202 may identify that persons, carts, luggage, or other objects are within the transportation mechanism 102 based on images taken by a camera, data generated by a proximity sensor 104, or the like.

In certain embodiments, the object module 202 determines an identity of an object, such as a particular user or object within the transportation mechanism 102. For example, the object module 202 may identify a user named "Bob," or that an object is a cart or a suitcase. In some embodiments, the object module 202 receives identification data from a server 110 to help identify the object. For example, the object module 202 may receive an image of a user's face from a camera sensor, and cross-reference the user's face with a database of faces located on the server 110. The server 110 may perform facial recognition to determine whether the image matches a user within the database and, if so, sends identification data to the object module 202.

The capacity module 204, in one embodiment, is configured to determine an available capacity of the transportation mechanism 102 as a function of the one or more identified objects. As used herein, the available capacity may comprise an amount of capacity within the transportation mechanism 102 that is unused and/or may be useable by a person or other object. In other words, the capacity module 204 determines whether there is room within the transportation mechanism 102 for another person and/or an object.

In one embodiment, the capacity module 204 determines an amount of capacity that each object utilizes within the transportation mechanism 102. In some embodiments, the amount of utilized capacity may comprise an amount of floor space that is utilized by an object, a relative amount of capacity that is utilized by an object, or the like. In some embodiments, the capacity module 204 determines an available amount of floor space in the transportation mechanism 102 as a function of the determined amount of floor space utilized by the one or more objects within the transportation mechanism 102.

In certain embodiments, the capacity module 204 determines an amount of floor space being utilized based on input received from the sensor 104. For example, the capacity module 204 may receive input from pressure sensors placed underneath the floor of an elevator that indicates which areas of the floor are being utilized. Similarly, the capacity module 204 may receive input from a number of cameras or proximity sensors (or from the object module 202) that indicate the number of objects within an elevator and the size of the objects within the elevator, which the capacity module 204 may use to calculate how much floor space is being used in the elevator.

To determine the available amount of floor space, for example, the capacity module 204 may determine how much floor space is available in the transportation mechanism 102 and how much floor space is being utilized by the objects in the transportation mechanism 102. The capacity module 204 may then subtract the utilized amount of floor space from the total amount of floor space to determine the available amount of floor space in the transportation mechanism 102. In certain embodiments, the capacity module 204 determines a predefined capacity utilization for each identified object within the transportation mechanism 102. For example, the capacity module 204 may query the server 110 for predefined capacity utilizations for a person or a cart within an elevator.

In one embodiment, the service module 206 is configured to service a call request in response to the available capacity satisfying a predetermined threshold. As used herein, a call request may comprise a request received from outside the transportation mechanism 102 and intended to notify the transportation mechanism 102 to stop and pick up people or goods. In some embodiments, the call request may be initiated by a person, such as a person who presses an elevator call button to have the elevator stop on her floor to pick her up, for example. In a further embodiment, the call request may be generated by one or more sensors 104 or predefined based on the transportation system. For example, a train system may be configured to stop, e.g., service a call request, at various locations along the trains paths.

In some embodiments, as used herein, the predetermined threshold may be a measurement of an available floor space, such as a number of square inches, feet, etc., a ratio of utilized floor space to available floor space, or the like. For example, if the available capacity within an elevator is enough to accommodate another person with luggage, then the service module 206 will stop on a floor requested by an outside user.

In some embodiments, the service module 206 ignores a call request in response to the available capacity not satisfying the predetermined threshold. For example, if the service module 206 determines that the available capacity in a subway is not enough to accommodate a person or other object, e.g., the available floor space does not satisfy the predetermined threshold, the service module 206 will ignore call request for persons or other objects requesting to get on the subway until persons or other objects get off the subway and free capacity space within the subway.

Figure 3:
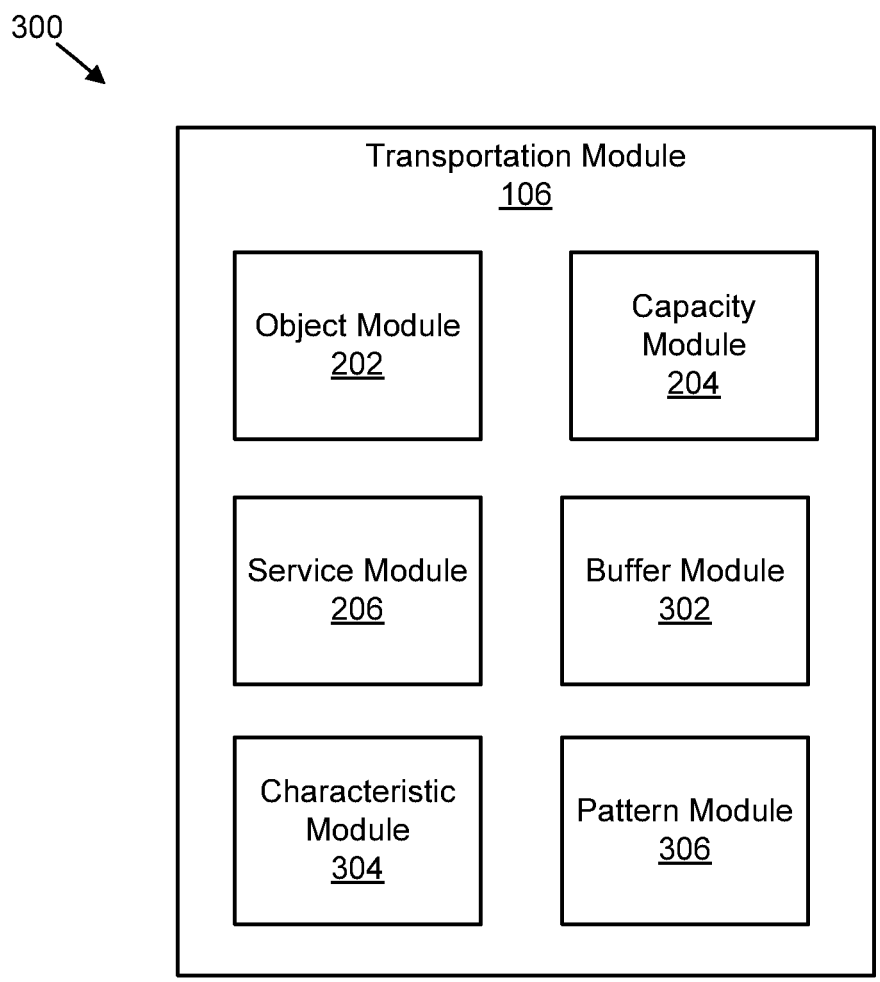
FIG. 3 is a schematic block diagram illustrating one embodiment of another module for determining available capacity in a transportation mechanism.

FIG. 3 is a schematic block diagram illustrating one embodiment of another module 300 for determining available capacity in a transportation mechanism 102. In one embodiment, the module 300 includes an embodiment of a transportation module 106. The transportation module 106, in certain embodiments, includes one or more of an object module 202, a capacity module 204, and a service module 206, which may be substantially similar to the object module 202, the capacity module 204, and the service module 206 described above with reference to FIG. 2. Further, the transportation module 106 may include one or more of a buffer module 302, a characteristic module 304, and a pattern module 306, which are described in more detail below.

In one embodiment, the buffer module 302 is configured to determine a buffer area for each of the identified objects within the transportation mechanism 102. As used herein, the buffer area comprises an additional amount of utilized floor space for each identified object. For example, persons within an elevator typically do not stand right next to each other, thus, it may be unrealistic to calculate the available capacity as if persons, or objects, are located directly next to one another. Therefore, the buffer module 302 determines a buffer area for each object within the elevator that is included in the determination of the utilized floor space.

In certain embodiments, the buffer module 302 determines a buffer area for an object based on the weather conditions where the transportation mechanism 102 is located. For example, if an elevator's location is experiencing a rainstorm, the buffer module 302 may increase the buffer area around different users within the elevator to account for users being wet due to rainfall, based on the notion that users will tend to not stand as close to one another if they are wet. Similarly, if the weather condition is hot and/or humid, the buffer module 302 may increase the buffer area around different users within the elevator to account for users' sweating behaviors.

In one embodiment, the buffer module 302 determines a buffer area for an object based on a type of the object and/or the size of the object. For example, the buffer module 302 may increase the buffer area around a cart within an elevator that may need additional room to maneuver to get in/out of the elevator. In some embodiments, the buffer module 302 may account for different shapes or designs of an object. For example, the buffer module 302 may increase the buffer area around odd-shaped objects such as trees, desks, or the like such that there is enough room to maneuver the objects within an elevator. Similarly, a larger person may need more room to move around than a smaller person, and, accordingly, the buffer module 302 may make a buffer area around the larger person bigger than the buffer area around the smaller person.

In one embodiment, the buffer module 302 determines a buffer area for a person based on the identity of the person. For example, the buffer module 302 may increase the buffer area for a user in response to determining that the user is the CEO of the company because the CEO may not want to share an elevator with other users and/or other users may not want to ride the elevator with the CEO. In such an embodiment, the buffer module 302 may increase the buffer area to include the entire available area of the transportation mechanism 102. Similarly, the buffer module 302 may reduce the buffer area around a user who is friendly, popular, or well-liked such that others can ride the transportation mechanism 102 with the user. In certain embodiments, the buffer module 302 uses the pattern module 306, described below, to determine the riding patterns of different users.

In one embodiment, the buffer module 302 determines a buffer area for an object based on the position of the object within the transportation mechanism 102. For example, if a cart or a user is located in an elevator in a position that would prevent someone from using available elevator space in the back corner of the elevator, the buffer module 302 may expand the cart's or the user's buffer area to cover the unusable area. In this manner, the capacity module 204 may not take into account areas of the transportation mechanism 102 that are difficult to reach or otherwise unusable as part of the available capacity.

In one embodiment, the characteristic module 304 is configured to determine one or more predefined characteristics for an identified object. In certain embodiments, the predefined characteristics comprise a location of the object (a floor the object is located on in a building, for example), a predetermined capacity utilization for the object (e.g., a calculated capacity, a user-defined capacity, or the like), a size of the object, and/or the like. For example, a cart may have a predetermined capacity utilization of 25 square feet and may generally be located on the second floor. Similarly, a user may have user-defined capacity utilization of nine square feet and may have an office on the tenth floor.

In certain embodiments, the characteristic module 304 maintains a list, database, data store, or the like of objects, e.g., users and other objects, and one or more characteristics for the objects. For example, the database may maintain a table of users and other objects and their corresponding locations, sizes, capacity utilizations, etc. In some embodiments, the characteristic module 304 may, over time, learn and update the characteristics for a user or object based on the input received by the sensors 104. For example, if the characteristic module 304 detects that the predetermined capacity utilization of a cart is greater than what the sensors 104 have detected over a period of time, the characteristic module 304 may update the predetermined capacity utilization for the cart. The capacity module 204 and/or the buffer module 302 may use the characteristic information to determine a utilized capacity for a transportation mechanism 102 and/or a buffer area for an object.

In one embodiment, the pattern module 306 is configured to track usage patterns associated with an identified object within the transportation mechanism 102. The capacity module 204 may determine the available capacity of the transportation mechanism 102 as a function of the determined usage patterns. In one embodiment, the pattern module 306 detects the usage patterns of users when a particular object or person is in the transportation mechanism 102. For example, the pattern module 306 may determine that users do not enter an elevator when a large cart is in the elevator or when a particular user (such as the CEO) is in the elevator. Similarly, the pattern module 306 may determine that users in the transportation mechanism 102 put more distance between themselves and another user or object within the transportation mechanism 102.

In certain embodiments, the pattern module 306 stores the results of tracking usage patterns for a period of time in a data store, which can be used by the capacity module 204, the buffer module 302, or the like, to determine a capacity utilization of a user and/or a buffer area of a user. For example, the pattern module 306 may store capacity data related to an object if users choose not to get in an elevator when the particular object is in the elevator. The capacity data may include the amount of floor space that is generally available when the object is in the transportation mechanism 102.

In one embodiment, the pattern module 306 may track periods of time when the transportation mechanism 102 is the most/least crowded, which the capacity module 204 and/or the buffer module 302 can use to determine a capacity utilization for an object at various periods of time. For example, the buffer module 302 may reduce the buffer area for different users during peak usage times, such as mornings or afternoons, so that a transportation mechanism 102 can be used at full capacity.

Figure 4:
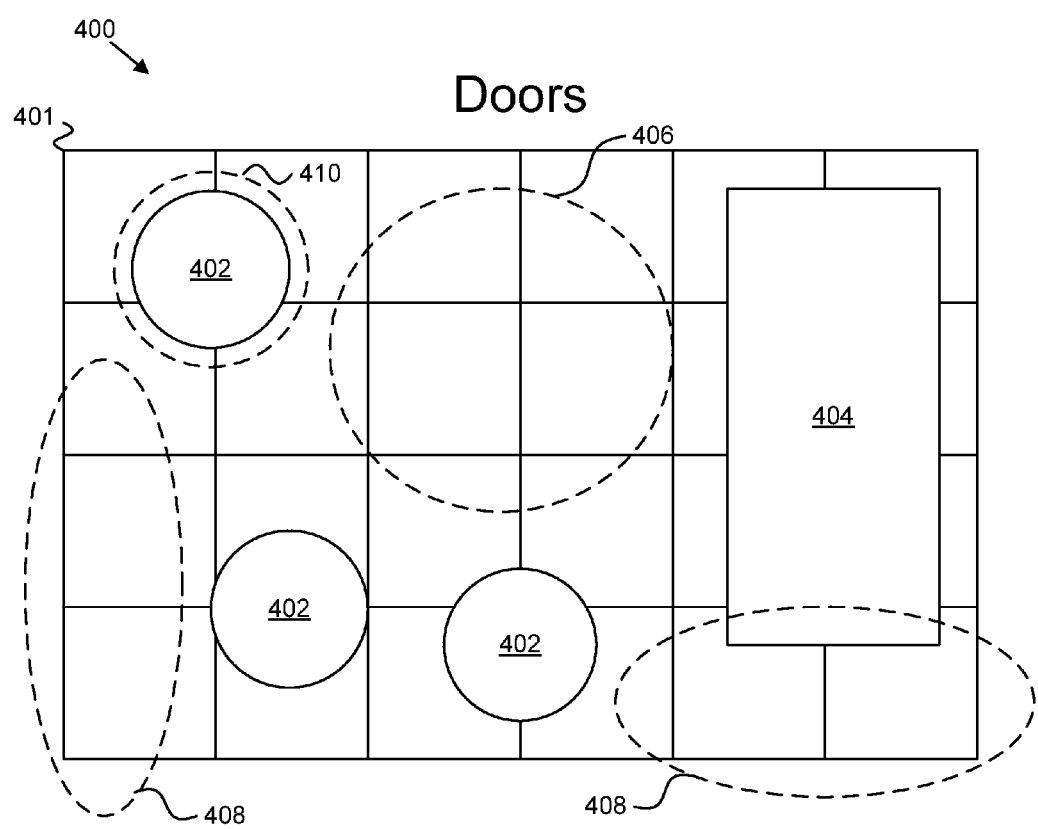
FIG. 4 is a schematic block diagram illustrating one embodiment of a transportation mechanism.

FIG. 4 is a schematic block diagram illustrating one embodiment of a transportation mechanism 400, which may be substantially similar to the transportation mechanism 102 described above. In one embodiment, the transportation mechanism 400 may include an embodiment of an elevator 401. The elevator 401 may include one or more users 402 and one or more other objects, such as a cart 404. The detection module 202 may identify the users 402 and the cart 404 within the elevator 401, and the capacity module 204 may determine an available capacity 406/408 within the elevator 401 based on the capacity utilization of the other objects 402/404.

In one embodiment, the capacity module 204 does not include certain areas of available space 408 as part of the available capacity calculation because these spaces 408 may be difficult or impossible to use due to the positions of other objects within the elevator 401. For example, certain spaces 408 may be difficult for a user to reach due to the position of the cart 404 and/or the users 402 already in the elevator 401. Moreover, in some embodiments, the buffer module 302 may include additional space 410 (a buffer area) around objects that becomes part of the utilized capacity and not available capacity. The buffer module 302 may determine the buffer area 410 as a function of different factors, such as weather conditions, the size of an object, the position of an object, the type of object, an identify of a user, and/or the like.

If the service module 206 determines that the determined available capacity, taking into account the space utilized by objects 402/404, buffer areas 410, and unusable areas 408, satisfies a predetermined threshold, the service module 206 may service a call request so that other users can enter the elevator 401. However, if the service module 206 determines that the determined available capacity fails to satisfy the predetermined threshold, the service module 206 will ignore elevator call requests until objects 402/404 get off the elevator 102 and free capacity for other users.

Figure 5:
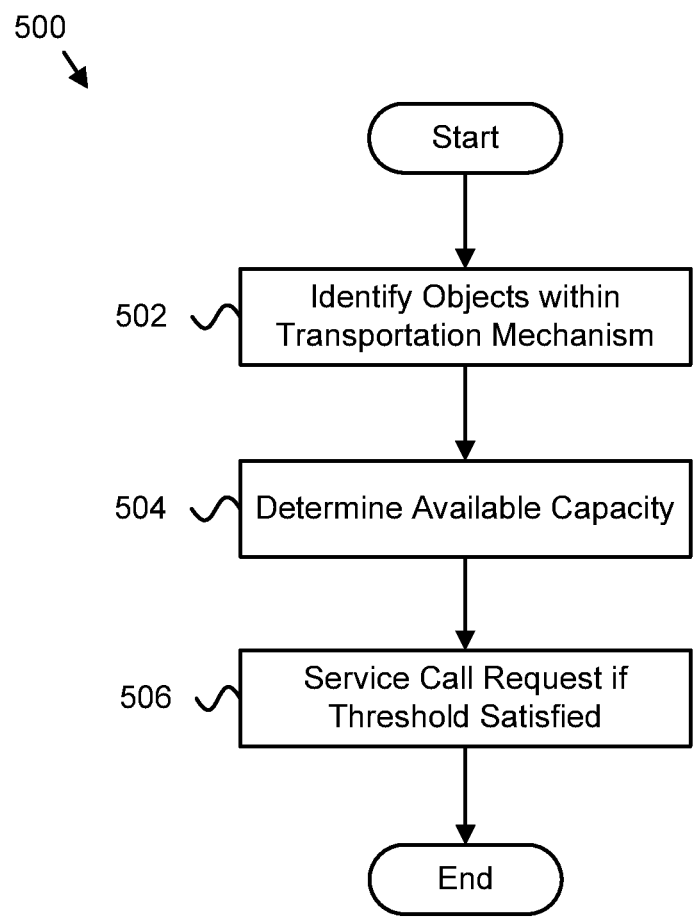
FIG. 5 is a schematic flow chart diagram illustrating one embodiment of a method for determining available capacity in a transportation mechanism.

FIG. 5 is a schematic flow chart diagram illustrating one embodiment of a method 500 for determining available capacity in a transportation mechanism 102. In one embodiment, the method 500 begins and the object module 202 identifies 502 one or more objects within the transportation mechanism 102 based on input received from the sensor 104. The capacity module 204, in certain embodiments, determines 504 an available capacity of the transportation mechanism 102 as a function of the one or more identified objects. In a further embodiment, the service module 206 services 506 a call request in response to the available capacity satisfying a predetermined threshold, and the method 500 ends.

Figure 6:
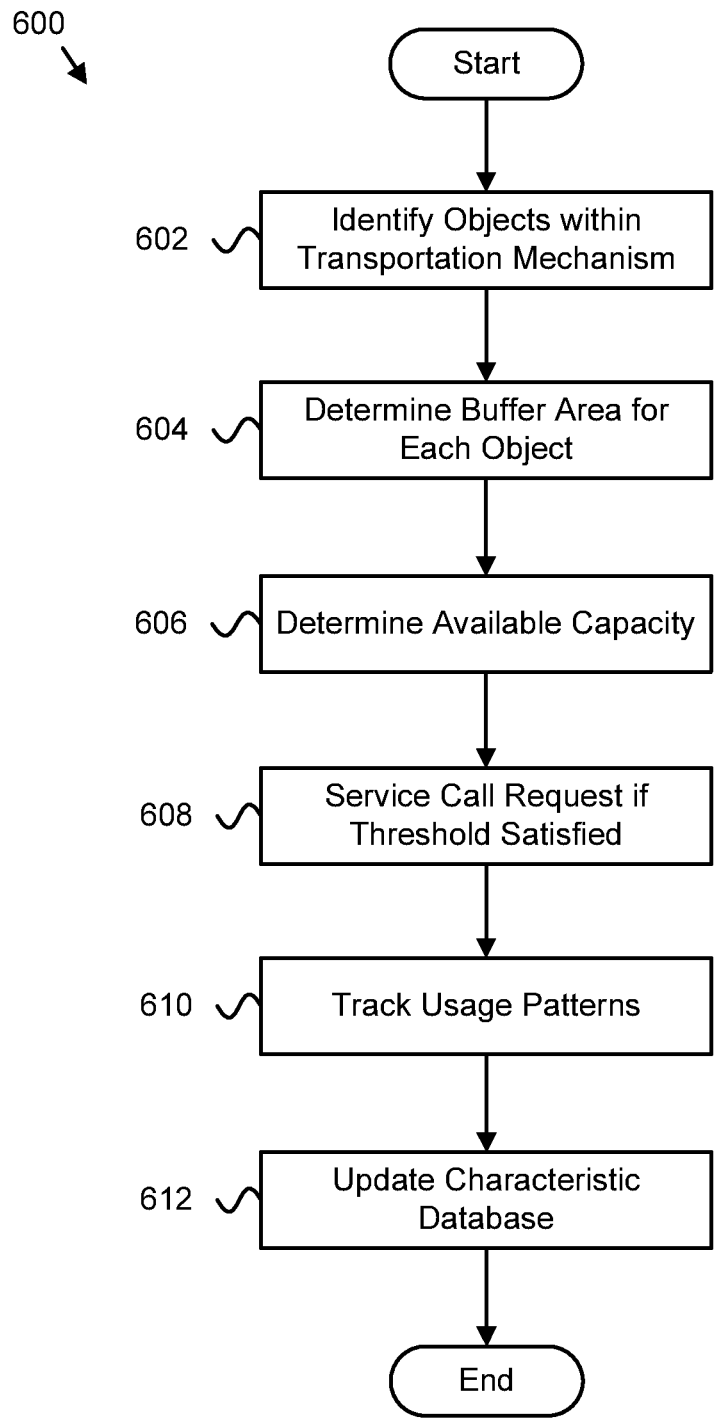
FIG. 6 is a schematic flow chart diagram illustrating one embodiment of another method for determining available capacity in a transportation mechanism.

FIG. 6 is a schematic flow chart diagram illustrating one embodiment of another method 600 for determining available capacity in a transportation mechanism 102. In one embodiment, the method 600 begins and the object module 202 identifies 602 one or more objects within the transportation mechanism 102 based on input received from the sensor 104. The sensor 104, in some embodiments, may comprise a camera, a proximity sensor, a motion sensor, a presence sensor, a pressure sensor, or the like.

In a further embodiment, the buffer module 302 determines 604 a buffer area for each of the identified objects within the transportation mechanism 102. The buffer area may include an additional amount of utilized capacity, such as an additional amount of floor space that each object utilizes. The buffer area may be based on different factors, such as weather conditions, the size of an object, the position of an object, the type of object, an identify of a user, and/or the like. Moreover, the buffer module 302 may check a characteristics database to determine if an object has one or more predefined or predetermined characteristics, such as the amount of capacity the object utilizes.

In one embodiment, the capacity module 204 determines 606 an available capacity of the transportation mechanism 102 as a function of the one or more identified objects. In certain embodiments, the capacity module 204 determines how much total capacity the transportation mechanism 102 has and subtracts the amount of utilized space and/or unusable space within the transportation mechanism 102 to determine the amount of available space. In certain embodiments, the service module 206 services 608 a call request in response to the available capacity satisfying a predetermined threshold, which may be defined in terms of an amount of floor space, a ratio of available space to utilized space, or the like.

In one embodiment, the pattern module 306 tracks 610 usage patterns associated with an object, such as how close users generally stand next to an object, how often the object uses the transportation mechanism 102, or the like. Based on the usage patterns, the capacity module 204 may determine an available capacity for the transportation mechanism 102 or the buffer module 302 may determine a buffer area for one or more objects associated with the tracking data. In one embodiment, the characteristic module 304 updates 612 a database of characteristics associated with an object, such as a size of the object, a predefined buffer area associated with the object, a capacity utilization of the object, or the like, based on input received from the sensors 104. The capacity module 204 and/or the buffer module 302 may use the characteristic data to determine a capacity utilization and/or buffer area for an object, and the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a sensor;
   a processor communicatively coupled to the sensor;

a memory that stores code executable by the processor, the code comprising:
  code that identifies one or more objects within a transportation mechanism based on input received from the sensor;
  code that determines an amount of capacity within the transportation mechanism that is utilized by each of the one of more objects;
  code that determines a buffer area for each of the one or more identified objects, the buffer area comprising an additional amount of capacity utilized by each of the one or more objects;
  code that determines an available capacity of the transportation mechanism as a function of the utilized capacity and the buffer area for each of the one or more identified objects; and
  code that services a call request in response to the available capacity satisfying a predetermined threshold.

2. The apparatus of claim 1, further comprising code that ignores the call request in response to the available capacity not satisfying the predetermined threshold.

3. The apparatus of claim 1, further comprising code that determines an amount of capacity that each object of the one or more identified objects utilizes, the amount of utilized capacity comprising an amount of utilized floor space.

4. The apparatus of claim 3, wherein determining the available capacity of the transportation mechanism comprises determining an available amount of floor space in the transportation mechanism as a function of the determined amount of floor space utilized by the one or more objects within the transportation mechanism.

5. The apparatus of claim 4, wherein the buffer area comprises an additional amount of utilized floor space for each identified object.

6. The apparatus of claim 5, wherein the buffer area for an identified object is determined as a function of a weather condition.

7. The apparatus of claim 5, wherein the buffer area for an identified object is determined as a function of one or more of a type and a size of the identified object.

8. The apparatus of claim 5, wherein the identified object comprises a person, and the buffer area for the person is determined as a function of an identity of the person.

9. The apparatus of claim 5, wherein the buffer area for an identified object is determined as a function of a position of the identified object within the transportation mechanism.

10. The apparatus of claim 1, further comprising code that determines one or more predefined characteristics for an identified object, the one or more characteristics being selected from the group consisting of a location of the object and a predetermined capacity utilization of the object.

11. The apparatus of claim 1, further comprising code that tracks usage patterns associated with an identified object, wherein the available capacity is determined as a function of the usage patterns.

12. The apparatus of claim 1, wherein the sensor is selected from the group consisting of a camera, a proximity sensor, a motion sensor, an infrared sensor, a laser sensor, an occupancy sensor, a pressure sensor, and an acoustic sensor.

13. A method comprising:
  identifying, by use of a processor, one or more objects within a transportation mechanism based on input received from a sensor;
  determining an amount of capacity within the transportation mechanism that is utilized by each of the one of more objects;
  determining a buffer area for each of the one or more identified objects, the buffer area comprising an additional amount of capacity utilized by each of the one or more objects;
  determining an available capacity of the transportation mechanism as a function of the utilized capacity and the buffer area for each of the one or more identified objects; and
  servicing a call request in response to the available capacity satisfying a predetermined threshold.

14. The method of claim 13, further comprising ignoring the call request in response to the available capacity not satisfying the predetermined threshold.

15. The method of claim 13, further comprising determining an amount of capacity that each object of the one or more identified objects utilizes, the amount of utilized capacity comprising an amount of utilized floor space.

16. The method of claim 15, wherein determining the available capacity of the transportation mechanism comprises determining an available amount of floor space in the transportation mechanism as a function of the determined amount of floor space utilized by the one or more objects within the transportation mechanism.

17. The method of claim 16, wherein the buffer area comprises an additional amount of utilized floor space for each identified object.

18. The method of claim 17, wherein the buffer area for an identified object is determined as a function of one or more of:
  a weather condition;
  a type of the identified object;
  a size of the identified object;
  a position of the identified object within the transportation mechanism; and
  an identity of a person, in response to the identified object comprising a person.

19. The method of claim 13, further comprising tracking usage patterns associated with an identified object, wherein the available capacity is determined as a function of the usage patterns.

20. A program product comprising a non-transitory computer readable storage medium that stores code executable by a processor, the executable code comprising code to perform:
  identifying one or more objects within a transportation mechanism based on input received from a sensor;
  determining an amount of capacity within the transportation mechanism that is utilized by each of the one of more objects;
  determining a buffer area for each of the one or more identified objects, the buffer area comprising an additional amount of capacity utilized by each of the one or more objects;
  determining an available capacity of the transportation mechanism as a function of the utilized capacity and the buffer area for each of the one or more identified objects; and
  servicing a call request in response to the available capacity satisfying a predetermined threshold.

* * * * *